Patented July 4, 1950

2,513,826

UNITED STATES PATENT OFFICE 2,513,826

AROMATIC SULFONHYDRAZIDES

Joseph A. Sprung and Willy A. Schmidt, Easton, Pa., assignors to General Aniline & Film Corporation, New York, N. Y., a corporation of Delaware No Drawing. Application December 5, 1946, Serial No. 714,146

1 Claim. (Cl. 260—556)

The present invention relates to β-aromatic sulfonhydrazides in which the terminal radical attached to the β-nitrogen atom is aromatic, said compounds being particularly useful in the production of azo dyestuffs.

Many proposals have been made in the photographic art dealing with the preparation of dyestuff images. One of the classical methods involves the development of an exposed silver halide emulsion with a primary aromatic amino developer in the presence of a color former which reacts with the oxidation products of the developer to produce a dyestuff image in situ with the silver image formed in the development of the emulsion. The color formers generally employed contain either a phenolic hydroxyl group or a reactive methylene group and upon reaction with the oxidation products of a primary aromatic amino developer lead to dyestuffs of the quinoneimine and azomethine class. These dyestuffs leave something to be desired, particularly from the standpoint of their stability to light, acids, alkalies and the like.

It is known that the azo dyes are much more stable than the aforesaid dyes and proposals have been made to utilize the same in the formation of dyestuff images in photography. The method most generally employed is that known as the silver dye bleach-out method which involves the treatment of a diffusely dyed silver halide emulsion containing a silver image with a bleaching bath which destroys the dyestuff in cooperation with the silver image. This method, however, is disadvantageous from the standpoint of the fact that it cannot be used with taking film since the colored emulsion layers act as filters. The process is therefore generally confined to the production of colored prints where the exposure may be regulated at will. The art has accordingly been assiduously seeking a method which would enable the production of azo dyestuff images in photography while avoiding the objections inherent in the silver dye bleach-out method.

In our co-pending application Serial No. 574,810, filed January 26, 1945, now U. S. Patent 2,424,256, of which the present application is in part a continuation, we have disclosed the preparation of azo dyestuff images in color photography by developing an exposed silver halide emulsion with a β-aromatic sulfonhydrazide in the presence of an azo dye coupling component. By this method there is produced in situ with the silver image an azo dyestuff image. The principle on which this process is based is the discovery that β-aromatic sulfonhydrazides in the presence of a mild oxidizing agent such as that supplied by a latent silver image are converted into diazo sulfones which react with the usual azo dyestuff components yielding azo dyes. It is pointed out in the prior application that the β-aromatic sulfonhydrazides which yield best results are those in which the aromatic radical linked to the β-nitrogen atom is substituted by a group more electropositive than hydrogen, such as an alkoxy, amino, or substituted amino group and the like. The diazo sulfones obtained from such sulfonhydrazides undergo coupling reactions similar to that of the corresponding diazonium salts. On the other hand, the β-aromatic sulfonhydrazides which contain in the aryl ring attached to the β-nitrogen atom an electronegative substituent such as a nitro, carboxy, sulfo group or the like, yield on oxidation, diazo sulfones which are quite reluctant to couple with azo dye components.

The β-sulfonhydrazides in which the aromatic radical linked to the β-nitrogen atom is substituted by electropositive groups represent new compounds. Such compounds are not only very effective in the preparation of azo dye images as indicated above, but in addition may be employed to produce azo dyes in textile printing processes in general. The manner in which such compounds undergo conversion to azo dyes is illustrated by the following equations:

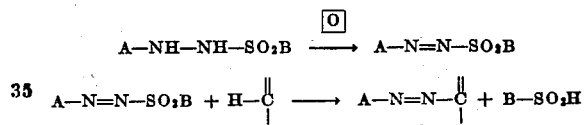

It is accordingly an object of the present invention to provide a new class of β-aromatic sulfonhydrazides in which the aromatic ring linked to the β-nitrogen atom is substituted by an electropositive group.

A further object of the present invention is β-aromatic sulfonhydrazides in which both terminal nuclei are aromatic and in which the aromatic ring linked to the β-nitrogen atom is substituted by groups more electropositive than hydrogen.

A further object of the present invention is to produce a new class of β-aromatic sulfonhydrazides which are especially suitable for the production of azo dyestuffs.

Other and further important objects of the invention will become apparent as the description proceeds.

The compounds contemplated by the present invention are typified by the following general formulae:

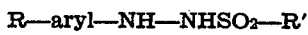

and

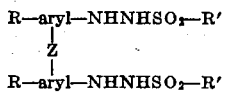

in which R is a substituent such as alkoxy, i. e., methoxy, ethoxy, butoxy, octadecoxy and the like, aryloxy such as phenoxy and the like, amino such as primary amino, alkylamino, i. e., methylamino, ethylamino, butylamino and the like, arylamino, i. e., phenylamino, naphthylamino and the like, aralkylamino, i. e., benzylamino and the like, heterocyclic amino joined to the aryl ring either through a NH group on the heterocyclic radical or through the hetero nitrogen atom of the heterocyclic radical, i. e., morpholino, piperazino, 9-carbazolyl, etc., aliphatic acylamino, i. e., methane sulfonamido, ethyl sulfonamido, acetamido, propionamido and the like, aromatic acylamino, i. e., benzamido, benzene sulfonamido and the like; R' represents acyclic and carbocyclic hydrocarbon radicals which may be aliphatic, alicyclic and aromatic. These hydrocarbon radicals may be substituted with groups such as amino, acylamino, alkoxy, aryloxy, sulfo, carboxy, hydroxy, polyethenoxy, ω-sulfoalkoxy and the like; Z is a linkage such as a carbon to carbon linkage, methylene, hydrocarbon substituted methylene, oxygen and the like, and aryl represents an aromatic hydrocarbon radical such as benzene, naphthalene, diphenyl and the like.

Examples of compounds falling within the above classification are the following:

1. β-(2,4 - dimethoxyphenyl)-benzenesulfonhydrazide

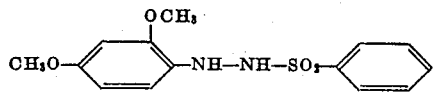

2. β - (2,5 - diethoxy-4-benzamidophenyl)-benzenesulfonhydrazide

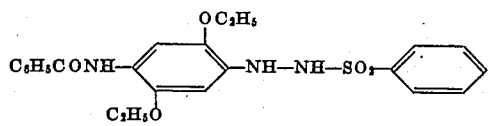

3. β - (2,5 - dimethoxy - 4 - benzamidophenyl) - benzenesulfonhydrazide

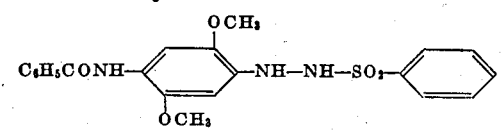

4. β - (2,5 - diethoxy - 4-benzamidophenyl)-p-acetamidobenzenesulfonhydrazide

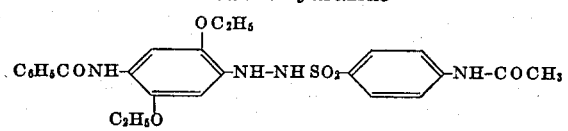

5. β - (8 - benzenesulfonamide -1-naphthyl)-p-acetamidobenzenesulfonhydrazide

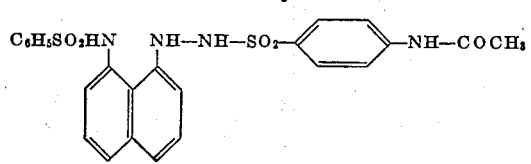

6. β - (4 - ethoxyphenyl) - benzenesulfonhydrazide

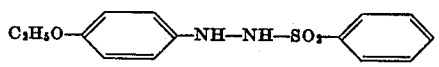

7. β - (2,5 - diethoxy - 4-benzamidophenyl)-4-aminobenzenesulfonhydrazide

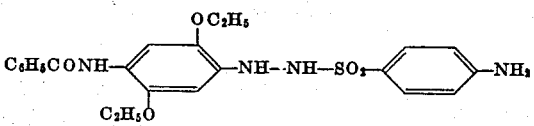

8. β - (4 - ethoxyphenyl) - 4-(β'-sulfoethoxy)-benzenesulfonhydrazide (sodium salt)

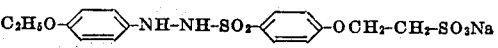

9. β -(4-acetamidophenyl)-4-(β'-sulfoethoxy)-benzenesulfonhydrazide (sodium salt)

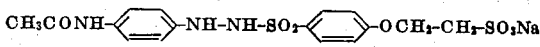

10. β - (2,4 - dimethyl -5-benzamidophenyl)-4-(β' - sulfoethoxy) - benzenesulfonhydrazide (sodium salt)

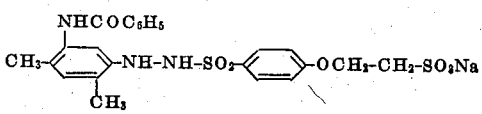

11. β - (2,4 - dimethyl-5-benzamidophenyl)-4-acetamidobenzenesulfonhydrazide

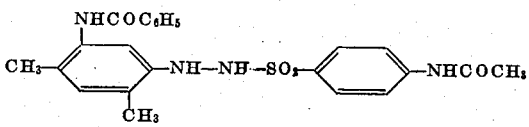

12. β - (3 - phenylsulfonamido) - 4-acetaminobenzenesulfonhydrazide

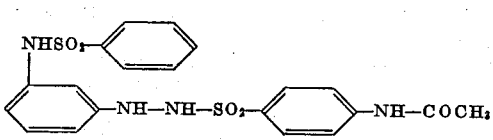

13. β - (4 - benzylaminophenyl) - 4 - aminobenzenesulfonhydrazide

14. β - (4 - anilinophenyl)-4-aminobenzenesulfonhydrazide

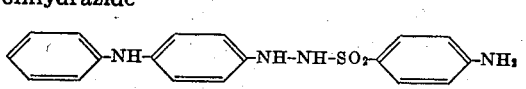

15. β - (4 - N-morpholinophenyl)-4-aminobenzenesulfonhydrazide

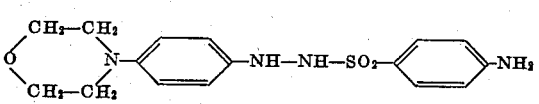

16. β - (4 - acetaminophenyl)-benzenesulfonhydrazide

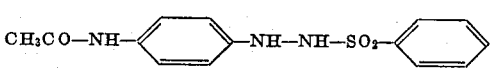

17. β - (3-ethylaminophenyl)-4-aminobenzenesulfonhydrazide

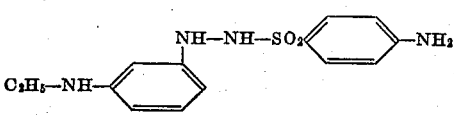

18. β - (2-phenoxyphenyl) -4-methoxybenzene-sulfonhydrazide

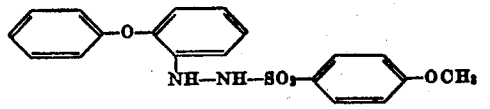

19. β-(4-oxamidophenyl)-4-acetaminobenzene-sulfonhydrazide

20. β-(4-(N,N-diethylsulfamido)-3-methoxy)-4-methoxybenzenesulfonhydrazide

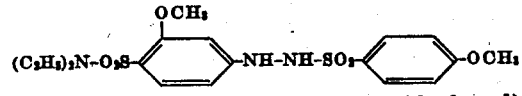

21. β - (2,5 - dimethoxy-4-benzamidophenyl) -4-acetamidobenzene-sulfonhydrazide

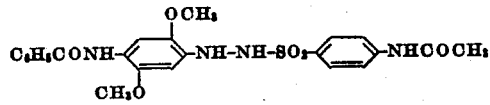

22. β - (2 - methoxy - 4-benzamido-5-methylphenyl) -4-acetamidobenzenesulfonhydrazide

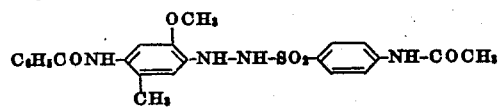

23. β,β' - (3,3'-diethoxy-4,4'-biphenylene)-bis-p-acetamidobenzenesulfonhydrazide

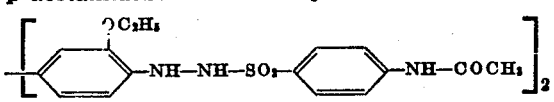

24. β,β' - di(4 - (β''-sulfoethoxy)-benzenesulfonyl) - 3,3'-dimethoxy-4,4'-biphenylenedihydrazine (disodium salt)

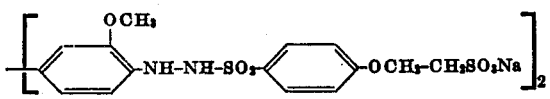

25. β,β' - di(4-aminobenzenesulfonyl) -3,3'-dimethoxy-4,4'-biphenylenedihydrazine

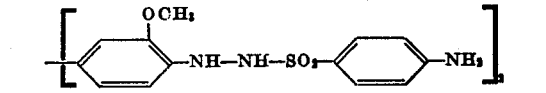

26. β,β' - di(4-acetamidobenzenesulfonyl) -3,3'-dimethoxy-4,4'-biphenylenedihydrazine

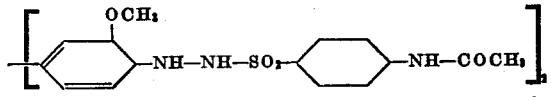

27. β,β' - di(4-ethoxybenzenesulfonyl) -3,3'-dimethoxy-4,4'-biphenylenedihydrazine

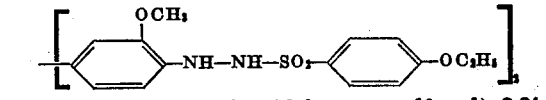

28. β,β' - di(4-acetamidobenzenesulfonyl)-3,3'-dihydrazino diphenylmethane

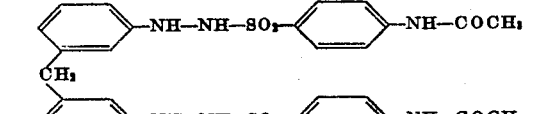

29. β,β' - di(4-(β''-sulfoethoxy)-benzenesulfonyl)-4,4'-dihydrazino diphenylmethane (disodium salt)

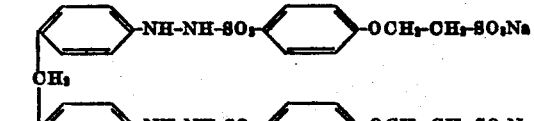

30. β,β'-di-(4-acetamidobenzenesulfonyl) -4,4'-dihydrazino diphenylmethane

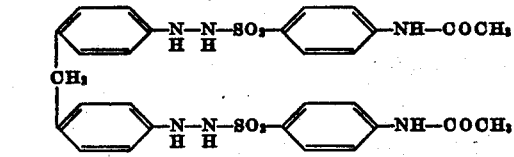

31. β,β'-di-(4-acetamidobenzenesulfonyl)-4,4'-dihydrazino - 2,2',5,5' - tetramethoxy - triphenylmethane

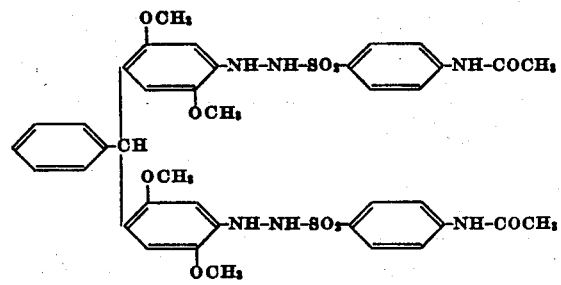

32. β - (2 - ethoxyphenyl)-methanesulfon-hydrazide

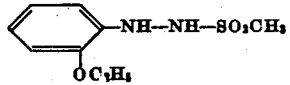

33. β,β' - di - (methanesulfonyl)-4,4'-dihydrazino-diphenyl ether

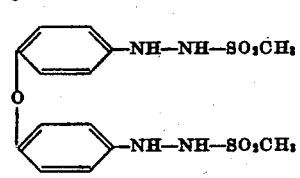

34. β - (5-chloro-2-methoxyphenyl)-methanesulfonhydrazide

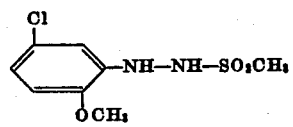

35. β-(2-ethoxyphenyl)-β'-sulfoethanesulfonhydrazide

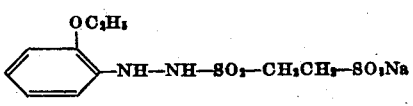

36. β-(4-ethoxyphenyl)-β' - carboxyethanesulfonhydrazide

37. β-(3-phenylsulfonamido)-β' - hydroxyethanesulfonhydrazide

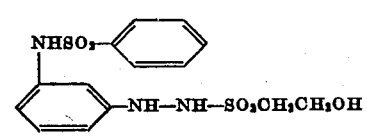

38. β-(4 - acetamidophenyl) - β' - hydroxyethenoxyethanesulfonhydrazide

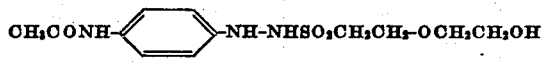

39. β-(4-acetamidophenyl)-cyclohexanesulfonhydrazide

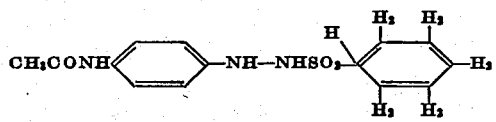

40. β-(4-ethoxyphenyl) - 4 - hydroxycyclohexanesulfonhydrazide

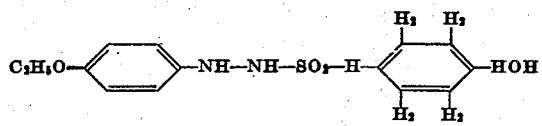

The β-aromatic sulfonhydrazides may be prepared by one of two methods. The first involves the reaction of a diazonium compound with an organic sulfinic acid and reduction of the diazosulfone thereby obtained and the second, the reaction of an organic hydrazine with an organic sulfonyl chloride. The organic sulfonyl chlorides may be readily produced by the chlorsulfonation of the desired organic compound, or by the action of phosphorus pentachloride on salts of the desired organic sulfonic acids. The organic sulfinic acids, on the other hand, are produced by reduction of the organic sulfonyl chlorides.

The β-arylsulfonhydrazides after oxidation to the diazo sulfones may be coupled with any of the usual azo dye coupling components such as aromatic compounds containing directing groups, i. e., phenolic hydroxy, alkoxy, amino and the like and possessing replaceable hydrogen atoms in the coupling position which is ortho or para to the directing group or with compounds possessing a reactive methylene group. Examples of such coupling components are:

Beta-naphthol
N-(β-naphthyl)-3-hydroxy-2-naphthamide
G salt
H acid
K acid
Gamma acid
2-hydroxy-3-naphthoic acid anilide
Acetoacetanilide
1-phenyl-5-pyrazolone and the like By the choice of suitable components, it is possible to secure azo dyes having a wide color range. Due to the greater inherent resonance of poly-azo dyestuffs and their resultant bluer color, we have found it desirable to use di-functional sulfonhydrazides to thereby obtain bis-azo dyes. It is also possible to prepare the poly-azo dyes by the reaction of di-functional sulfonhydrazides with coupling components containing one or more azo groups. The β-aromatic sulfonhydrazides of this invention are also useful as components of pesticidal compositions, for example as insecticides.

The following examples, in which the parts are by weight, further illustrate the invention:

*Example I.*—β-(2,5-diethoxy-4 - benzamidophenyl)-4-acetamidobenzenesulfonhydrazide

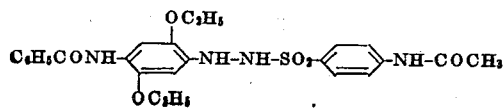

A suspension of 8.4 parts of 2,5-diethoxy-4-benzamidoaniline hydrochloride in 2.4 parts conc. hydrochloric acid, 9.6 parts formic acid and 100 parts water was diazotized with a solution of 1.8 parts sodium nitrite in 10 parts water. The excess nitrous acid was destroyed with sulfamic acid and the filtered diazonium salt solution was added to a solution of 5.2 parts of p-acetamidobenzenesulfinic acid and 1.62 parts sodium carbonate monohydrate in 100 parts water. The orange colored precipitate was removed by filtration, washed well with water and air dried. The product weighing 11.3 parts (89%), melted with decomposition at approximately 110° C.

A solution of 2.55 parts of the above diazo-sulfone in a mixture of 50.0 parts of acetone, 0.75 part of glacial acetic acid and 1.0 part of H₂O is slowly treated at room temperature under vigorous stirring with zinc dust until the solution turns from a deep orange to a faint yellow color. The zinc compounds are removed by filtration, and the cooled filtrate is diluted with 25.0 parts of water. The sulfonhydrazide, which separates, is removed by filtration and dried in a vacuum desiccator over phosphorus pentoxide. The yield is 1.6 parts or 62%. The material when recrystallized from dilute ethanol melted at 166° C. with decomposition.

*Example II.*—β-(4-acetamidophenyl)-benzenesulfonhydrazide

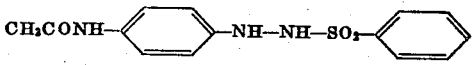

A suspension of 15.0 parts of p-aminoacetanilide in a solution of 10.7 parts of conc. hydrochloric acid, 36 parts of formic acid in 150 parts of water was diazotized with a solution of 7.2 parts of sodium nitrite in 50 parts of water. The excess nitrous acid was destroyed with sulfamic acid and the filtered diazonium salt solution was added to a solution of 17.2 parts of sodium benzenesulfinate in 50 parts of water. After 1 hour, the solid, 4-acetaminobenzene-diazo-(phenyl)-sulfone, was removed by filtration and washed with 500 parts of water. After the material was air-dried, 26.0 parts (86%) of the diazosulfone were obtained.

A solution of 15.2 parts of 4-acetamidobenzenediazo-(phenyl)-sulfone in 100 parts of dimethyl formamide, 6.1 parts of glacial acetic acid and 5 parts of water was slowly treated with zinc dust until the color of the solution had changed from a deep orange to a faint yellow. The temperature was not allowed to rise above 40° C. The zinc salts were removed by filtration and the filtrate was poured into a cold solution of 12 parts of conc. hydrochloric acid in 1000 parts of water. The sulfonhydrazide, which precipitated, was removed by filtration, washed well with water, and air dried. The yield is 11.4 parts or 75%.

*Example III.*—β-(4-ethoxyphenyl) - 4 - (β'-sulfoethoxy)-benzenesulfonhydrazide

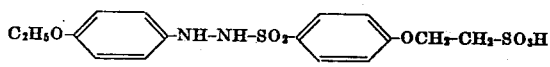

A solution of 1.37 parts of p-phenetidine in 3.7 parts of formic acid and 10 parts of water is diazotized with a solution of 0.7 parts of sodium nitrite in 5 parts of water. The filtered diazonium salt solution is poured into a solution of 3.10 parts of the disodium salt of β-(p-sulfinophenoxy)-ethanesulfonic acid (prepared as in Example X hereof), in 10 parts of water. Forty parts of absolute ethanol was added and the precipitated diazosulfone is removed by filtration and washed with absolute ethanol and acetone. The yield of product, 4-ethoxybenzenediazo-[4-($\beta'$-sulfoethoxy)-phenyl]-sulfone, is 2.3 parts.

A solution of the above compound in 15 parts of dimethyl formamide and 1.1 parts of glacial acetic acid is treated with sufficient zinc dust to cause the color of the solution to change from an orange to a faint yellow. The zinc salts are removed by filtration, and the filtrate is diluted with 80 parts of acetone. The sulfonhydrazide is removed by filtration and washed with acetone. After air drying, 0.9 part of product is obtained.

*Example IV.*—$\beta$-(4-acetamidophenyl)-4-($\beta'$-sulfoethoxy)-benzenesulfonhydrazide

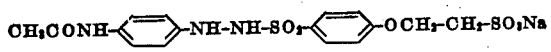

A suspension of 1.36 parts of p-aminoacetanilide in 3.7 parts of formic acid and 10 parts of water is diazotized with a solution of 0.69 part of sodium nitrite in 5 parts of water. The excess nitrous acid is destroyed with sulfamic acid, and the filtered diazonium salt solution is poured into a solution of 3.10 parts of the di-sodium salt of $\beta$-(p-sulfinophenoxy)-ethanesulfonic acid (prepared as in Example X hereof) in 5 parts of water. Eighty parts of absolute ethanol are added, and the precipitated diazosulfone is removed by filtration and washed with absolute ethanol and acetone. The product, 4-acetamidobenzenediazo-[4-($\beta'$-sulfoethoxy)-phenyl]-sulfone, amounts to 2.9 parts.

A solution of 1 part of the above compound in 10 parts of dimethyl formamide and 1.1 parts glacial acetic acid is reduced with zinc dust in the usual manner. The zinc salts are removed by filtration, and the filtrate is diluted with 40 parts of acetone. The sulfonhydrazide, which is removed by filtration and air dried, amounts to 0.4 part.

*Example V.*—$\beta,\beta'$ Di[4-$\beta''$ sulfoethoxy)-benzenesulfonyl]-4,4'-dihydrazinodiphenylmethane

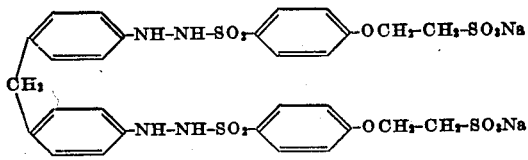

A suspension of 1.98 parts of 4,4'-diaminodiphenylmethane in 3.7 parts of formic acid, 4.8 parts of conc. hydrochloric acid and 10 parts of water is tetrazotized with a solution of 1.40 parts of sodium nitrite in 5 parts of water. The filtered diazonium salt solution is poured into a solution of 6.2 parts of the di-sodium salt of $\beta$-(p-sulfinophenoxy)-ethanesulfonic acid in 10 parts of water. Eighty parts of absolute ethanol are added, and the precipitated diazosulfone is removed by filtration and washed with absolute ethanol and acetone and dried. The product, 4,4'-diphenylmethane-bis-diazo-[4-($\beta'$-sulfoethoxy)-phenyl]-disulfone, amounts to 7.0 parts.

A solution of 1.99 parts of the diazosulfone in 25 parts of dimethyl formamide and 1.2 parts of glacial acetic acid is reduced with zinc dust in the usual manner. The zinc salts are removed by filtration and the filtrate diluted with 80 parts of acetone. The sulfonhydrazide is removed by filtration and washed with acetone. After drying, 1.3 parts of the product are obtained.

*Example VI.*—$\beta,\beta'$ - Di(4 - acetamidobenzenesulfonyl)-4,4'-dihydrazinodiphenylmethane

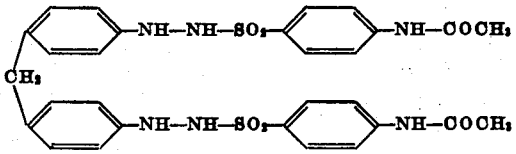

A solution of 3.96 parts of 4,4'-diaminodiphenylmethane in 7.3 parts of formic acid, 9.6 parts of conc. hydrochloric acid and 50 parts of water is tetrazotized with an aqueous solution containing 2.8 parts of sodium nitrite. The excess nitrous acid is destroyed with sulfamic acid and the filtered diazonium salt solution is poured into a solution of 8.4 parts of p-acetamidobenzenesulfinic acid and 2.7 parts of sodium carbonate monohydrate in 50 parts of water. The diazosulfone is removed by filtration, washed well with water and air dried. The product, 4,4'-diphenylmethane - bis - diazo - (4 - acetamidophenyl)-disulfone, amounts to 10.5 parts.

A solution of the above diazosulfone in 50 parts of dimethyl formamide and 5.3 parts of glacial acetic acid is reduced in the usual manner with zinc dust. The zinc salts are removed by filtration and the filtrate poured into water. The sulfonhydrazide is removed by filtration and washed well with water. After air drying, the product amounts to 8.2 parts.

*Example VII.*—$\beta$-(2-methoxynaphthyl) - 4-acetaminobenzenesulfonhydrazide

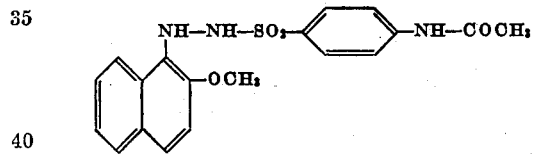

A suspension of 0.88 part of 2-methoxy-$\alpha$-naphthylamine in a solution of 6 parts of conc. hydrochloric acid and 25 parts of water was diazotized with an aqueous solution of 0.35 part of sodium nitrite. The filtered diazonium salt solution was added to an aqueous solution of 1.00 part of p-acetamidobenzene sulfinic acid. The solid, 2 - methoxynaphthalenediazo - (p - acetamidophenyl) - sulfone, was removed by filtration, washed with water and air dried.

The above compound was reduced in acetone solution with zinc dust and acetic acid, as in Example I, to the corresponding sulfonhydrazide.

*Example VIII.*—$\beta,\beta'$ - Di - (4 - acetamidobenzenesulfonyl) - 3,3' - dimethoxy - 4,4'-biphenylenedihydrazine

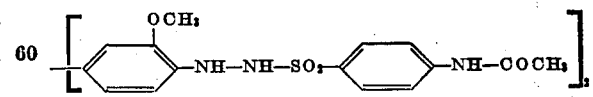

A solution of 3.17 parts of dianisidine dihydrochloride in 6 parts of formic acid and 25 parts of water was tetrazotized with a solution of 1.44 parts of sodium nitrite in 10 parts of water. The excess nitrous acid was destroyed with sulfamic acid and the filtered diazonium salt solution was poured into a solution of 4.0 parts of p-acetamidobenzenesulfinic acid and 1.24 parts of sodium carbonate monohydrate in 25 parts of water. The diazosulfone was removed by filtration, washed well with water and dried in a vacuum desiccator over phosphorus pentoxide. The yield amounts to 5.4 parts (81%) of 3,3'-dimethoxy - 4,4' - biphenyl - bis - diazo - (4 - acet-amido-phenyl) -disulfone.

A solution of 5.0 parts of 3,3'-dimethoxy-4,4'-biphenyl - bis - diazo - (4 - acetamidophenyl)-disulfone in 35 parts of dimethyl formamide and 2.1 parts of glacial acetic acid was reduced in the usual manner with zinc dust. The zinc salts were removed by filtration and the filtrate was poured into 100 parts of water. The sulfohydrazide was removed by filtration, washed well with water and dried in a vacuum desiccator over phosphorus pentoxide. The yield is 4.1 parts (82%).

*Example IX.—β-(2-ethoxyphenyl)-methane sulfonhydrazide*

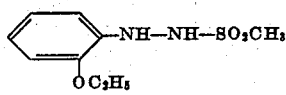

A mixture of 37.0 parts of 2-ethoxyphenylhydrazine hydrochloride, 22.9 parts of methane sulfonyl chloride and 33.6 parts of sodium bicarbonate in 283 parts of ethyl ether was stirred for 1 hour at room temperature and finally refluxed for 2 hours on a steam bath. The cooled mixture was treated with 264 parts of low-boiling petroleum ether and the precipitated material was removed by filtration and washed with petroleum ether. The solid was digested twice at room temperature with dilute hydrochloric acid (6 parts of hydrochloric acid in 250 parts of water) and finally washed with water and air dried. The product, melting at 105° C., amounted to 40 parts (87%).

Analysis: Calc. for $C_9H_{14}O_3N_2S$, C=46.94; H=6.12. Found, C=47.12; H=6.02.

*Example X.—β,β'-Di[4-(β''-sulfoethoxy)-benzenesulfonyl]-3,3'-dimethoxy-4,4'-biphenylene dihydrazine*

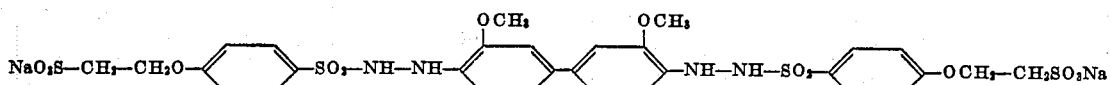

A solution of 100.5 parts of β-phenoxyethyl bromide (prepared by the method of "Organic Syntheses," Coll. vol. I (2nd ed.), p. 436, note 6) in 500 parts of chloroform was cooled to 0° C. (ice salt bath) and treated with 250 parts chlorosulfonic acid at such a rate that the temperature was not allowed to rise above 5° C. The addition of the first mole of chlorosulfonic acid was accompanied by a rapid rise in temperature and a copious evolution of hydrogen chloride. Although the remainder of the chlorosulfonic acid was added very rapidly, no appreciable rise in temperature was noted. The reaction mixture was poured into ice water and the chloroform layer was separated. The aqueous layer was extracted once with 50 parts of chloroform and the combined chloroform extract was washed once with 250 parts of cold water. After the chloroform solution had been dried over anhydrous sodium sulfate, the chloroform was removed by distillation (steam bath), and the liquid residue was digested with 240 parts of cold low-boiling petroleum ether. The solid was removed by filtration and dried in a vacuum desiccator over sodium hydroxide. The compound, 4-(β-bromethoxy)-benzenesulfonyl chloride, amounted to 124 parts (82% yield) and melted at 65° C.

To a well-stirred suspension of 120.0 parts of finely powdered 4-(β-bromethoxy)-benzenesulfonyl chloride and 63.0 parts of anhydrous sodium sulfite in 1000 parts of water, there was added 10% sodium hydroxide solution at such a rate that the pH of the solution was maintained at 8–9. About 286 parts of 10% sodium hydroxide were required. After the mixture had been stirred for about 4 hours, all but 4.0 parts of the sulfonyl chloride had dissolved and the pH of the solution remained constant. The cooled, filtered solution was acidified with 83 parts of conc. hydrochloric acid, and the precipitated material was removed by filtration. The crude sulfinic acid was redissolved in 250 parts of 10% sodium carbonate solution and 1000 parts of water and was reprecipitated with 60 parts of conc. hydrochloric acid. The solid material was removed by filtration, washed with a small amount of cold water and dried on a porous plate. The compound, 4-(β-bromethoxy)-benzenesulfinic acid, amounted to 75 parts (71% yield) and melted between 80 and 90° C., depending on the rate of heating.

Sixty-six parts of 4-(β-bromethoxy)-benzenesulfinic acid were added to a solution of 16.0 parts of sodium carbonate monohydrate in 250 parts of water. When carbon dioxide was no longer evolved, 33.0 parts of anhydrous sodium sulfite were added and the whole was refluxed for 1.5 hours. The solution was concentrated to about half its volume and then treated with 320 parts of absolute ethanol. After the mixture had been allowed to remain in an ice bath for 1 hour, the product which separated was removed by filtration. The filter cake was washed once with a cold solution of 15 parts of water in 40 parts of absolute ethanol. The disodium salt of β-(4-sulfinophenoxy)-ethane sulfonic acid, after drying in an oven at 105° C., amounted to 64.0 parts (83% yield).

A warm solution of 3.17 parts of pure dianisidine dihydrochloride in 2.4 parts of formic acid and 15 parts of water was cooled to 5° C. and tetrazotized with 1.44 parts of sodium nitrite in 5.0 parts of water. The excess nitrous acid was destroyed with sulfamic acid and the filtered diazonium salt solution was poured into a solution of 6.5 parts of the the di-sodium salt of β-(4-sulfinophenoxy)-ethanesulfonic acid in 10.0 parts of water. Eighty parts of absolute ethanol were added and the material, which separated, was removed by filtration. The compound, 3,3'-dimethoxy-4,4' - biphenylene - bis - diazo-[4-(β''-sulfoethoxy)-phenyl]-sulfone was digested with 80 parts of acetone and air dried. The yield is 6.8 parts (81%).

A solution of 2.1 parts of the above diazosulfone in 2.0 parts of water, 1.0 part of acetic acid and 25.0 parts of dimethylformamide was treated with zinc dust at room temperature until the color of the solution changed from a deep red to a faint orange. The zinc compounds were removed by filtration, and the filtrate was poured into 150 parts of cold acetone. The precipitate, β,β'-di[4-(β''-sulfoethoxy)-benzenesulfonyl]-3,3'-dimethoxy-4,4'-bi-phenylene dihydrazine, was removed by filtration and washed with acetone. The yield is 1.3 parts (62%).

Various modifications of the invention will occur to persons skilled in the art and we therefore do not intend to be limited in the patent granted except as necessitated by the prior art and the appended claims.

We claim:

A β-aromatic sulfonhydrazide of the following formula:

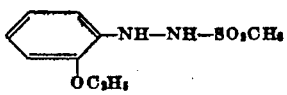

JOSEPH A. SPRUNG.
WILLY A. SCHMIDT.

REFERENCES CITED

The following references are of record in the file of this patent:

UNITED STATES PATENTS

| Number | Name | Date |
|---|---|---|
| 2,272,134 | Shappirio | Feb. 3, 1942 |
| 2,424,256 | Schmidt et al. | July 22, 1947 |

FOREIGN PATENTS

| Number | Country | Date |
|---|---|---|
| 68,719 | Germany | Apr. 26, 1893 |
| 70,459 | Germany | Aug. 30, 1893 |
| 12,872 | Great Britain | 1900 |

OTHER REFERENCES

Konigs, "Ber. Deut. Chem.," vol. 10 (1877), pp. 1531–1534.

Limpricht, "Ber. Deut. Chem.," vol. 20 (1887), pp. 1239–1241.

Altschul, "Ber. Deut. Chem.," vol. 25 (1892), pp. 1843–1844.

Hantsch et al., "Ber. Deut. Chem.," vol. 30 (1897), pp. 314–315.

Gatterman, "Ber. Deut. Chem.," vol. 32 (1899), p. 1154.

Bell, "J. Chem. Soc." (London), 1936, pp. 1242–1244.

Saunders "The Aromatic Diazo Compounds and Their Technical Applications" (1936), pp. 48 to 50.